US012597579B2

(12) United States Patent

Bissal et al.

(10) Patent No.: US 12,597,579 B2

(45) Date of Patent: Apr. 7, 2026

(54) CIRCUIT BREAKER AND POWER SUPPLY SYSTEM

(71) Applicant: Huawei Digital Power Technologies Co., Ltd., Shenzhen (CN)

(72) Inventors: Ara Bissal, Nuremberg (DE); Fugao Zhao, Dongguan (CN); Shuai Wang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 252 days.

(21) Appl. No.: 18/470,780

(22) Filed: Sep. 20, 2023

(65) Prior Publication Data

US 2024/0013996 A1 Jan. 11, 2024

Related U.S. Application Data

(63) Continuation of application No. PCT/CN2021/084131, filed on Mar. 30, 2021.

(51) Int. Cl.

*H01H 73/04* (2006.01)

*H01H 73/18* (2006.01)

(52) U.S. Cl.

CPC ............ *H01H 73/18* (2013.01); *H01H 73/04* (2013.01)

(58) Field of Classification Search

CPC ........ H01H 73/18; H01H 73/04; H01H 9/542; H01H 9/541; H01H 2009/543; H01H 2009/544; H01H 33/285; H01H 3/222

(Continued)

(56) References Cited

U.S. PATENT DOCUMENTS

| | | | | |
|---|---|---|---|---|
| 6,295,191 | B1 * | 9/2001 | Kishida ................ | H01H 33/285 361/139 |
| 8,503,138 | B2 * | 8/2013 | Demetriades .......... | H01H 9/542 361/11 |

(Continued)

FOREIGN PATENT DOCUMENTS

| | | | |
|---|---|---|---|
| CN | 104362580 | A | 2/2015 |
| CN | 104637753 | A | 5/2015 |

(Continued)

OTHER PUBLICATIONS

Zhang et al., "Research on the Mathematic Model and Movement Characteristics Simulation of New Fast Repulsion Mechanism", 2016 IEEE International Conference on High Voltage Engineering and Application, IEEE, Sep. 22, 2016, 4 pages.

*Primary Examiner* — William A Bolton

(74) *Attorney, Agent, or Firm* — Maier & Maier, PLLC

(57) ABSTRACT

A circuit breaker includes a mechanical switch circuit, and the mechanical switch circuit includes a busbar, a power module, and a drive module. The power module includes a movable contact and a stationary contact that is electrically connected to the busbar. When the movable contact is connected to the stationary contact, the mechanical switch circuit is connected. The drive module includes a switch circuit, a movable coil, and a stationary coil. The movable coil and the stationary coil are disposed adjacently, the switch circuit is configured to control a current direction of the movable coil and a current direction of the stationary coil, and the movable coil and the stationary coil attract or repel each other based on whether the current directions are the same to enable the movable coil to drive the movable contact to be connected to or disconnected from the stationary contact.

20 Claims, 8 Drawing Sheets

(58) Field of Classification Search
USPC .................... 218/149; 361/8, 2; 335/16, 158
See application file for complete search history.

(56) References Cited

U.S. PATENT DOCUMENTS

| | | | | |
|---|---|---|---|---|
| 8,638,531 | B2 * | 1/2014 | Bhavaraju | H01H 50/045 361/8 |
| 10,134,551 | B2 * | 11/2018 | Potter | H01H 49/00 |
| 2002/0044403 | A1 | 4/2002 | Takeuchi et al. | |
| 2005/0146814 | A1 | 7/2005 | Sellier et al. | |
| 2010/0254046 | A1 * | 10/2010 | Liu | H02H 3/087 361/13 |
| 2011/0102052 | A1 * | 5/2011 | Billingsley | H01H 9/542 327/365 |
| 2013/0027158 | A1 | 1/2013 | Bach et al. | |
| 2016/0329179 | A1 * | 11/2016 | Kim | H01H 33/596 |
| 2017/0288395 | A1 * | 10/2017 | Sim | H02H 3/087 |

FOREIGN PATENT DOCUMENTS

| | | | |
|---|---|---|---|
| CN | 107769369 | A | 3/2018 |
| CN | 110620022 | A | 12/2019 |
| CN | 111029190 | A | 4/2020 |
| EP | 0664552 | A1 | 7/1995 |
| EP | 1107270 | A2 | 6/2001 |

* cited by examiner

60

20

CIRCUIT BREAKER AND POWER SUPPLY SYSTEM

CROSS-REFERENCE TO RELATED APPLICATIONS

This application is a continuation of International Application No. PCT/CN2021/084131, filed on Mar. 30, 2021, the disclosure of which is hereby incorporated by reference in its entirety.

TECHNICAL FIELD

The embodiments relate to the electrical field, a circuit breaker and a power supply system.

BACKGROUND

Currently, power supply systems are widely used, and circuit breakers are often used in the systems to implement functions such as power distribution and protection. The circuit breaker may be used in a direct-current power supply system or an alternating-current power supply system. Conventional circuit breakers include mechanical circuit breakers and solid-state circuit breakers, but both the mechanical circuit breaker and the solid-state circuit breaker have their own drawbacks. The mechanical circuit breaker needs a plurality of linkage apparatuses in a switching process, for example, a spring, a hook, a lever, and an armature, and linkage time is long. In addition, the mechanical circuit breaker uses contacts to implement circuit conduction and disconnection, an electric arc is generated in a contact gap when the mechanical circuit breaker is opened, and arcing time is long. The electric arc is cylindrical gas that emits strong light and conducts electricity and that is generated in the contact gap when the mechanical circuit breaker is opened. The circuit breaker is opened after the electric arc goes out and the contact gap becomes an insulating medium. The arcing time is a time period in which an electric arc is generated in each phase of the circuit breaker when the circuit breaker is opened. For the foregoing reasons, the mechanical circuit breaker can implement only breaking time in milliseconds (ms), and a short-circuit breaking speed is slow. The solid-state circuit breaker uses a power electronic device instead of a switch to implement conduction and disconnection, and the solid-state circuit breaker can implement very fast switching time. However, limited to a current manufacturing process of a power electronic switch, a conduction loss of the solid-state circuit breaker is high, and a water-cooled radiator is often needed, which increases a volume and costs.

Therefore, the industry urgently needs a circuit breaker that can implement a fast short-circuit breaking speed, a low conduction loss, and low costs.

SUMMARY

The embodiments provide a circuit breaker and a power supply system, to improve switching performance of the circuit breaker.

According to a first aspect, a circuit breaker is provided, including a mechanical switch circuit, where the mechanical switch circuit includes a busbar; a power module, including a movable contact and a stationary contact, where the stationary contact is electrically connected to the busbar, the movable contact is movable, when the movable contact is connected to the stationary contact, the mechanical switch circuit is connected, and when the movable contact is disconnected from the stationary contact, the mechanical switch circuit is disconnected; and a drive module, including a switch circuit, a movable coil, and a stationary coil, where the movable coil and the stationary coil are disposed adjacently, the switch circuit is configured to control a current direction of the movable coil and a current direction of the stationary coil, and the movable coil and the stationary coil attract or repel each other based on whether the current directions are the same, to enable the movable coil to drive the movable contact to be connected to or disconnected from the stationary contact.

The circuit breaker includes the mechanical switch circuit, and the switch circuit in the mechanical switch circuit controls the current direction of the movable coil and the current direction of the stationary coil, so that the movable coil and the stationary coil can attract or be disconnected from each other, and the movable coil can drive the movable contact to be connected to or disconnected from the stationary contact. Finally, conduction and disconnection of the mechanical switch circuit is implemented. The switching manner simplifies linkage apparatuses and optimizes switching performance of the circuit breaker. For example, switching time of the mechanical switch circuit can be reduced, thereby reducing switching time of the circuit breaker.

With reference to the first aspect, in a possible implementation, the movable coil and the movable contact are of a fixed connection structure, or a linkage structure is disposed between the movable coil and the movable contact.

The movable coil and the movable contact are of the fixed connection structure, or the linkage structure is disposed between the movable coil and the movable contact, so that when the movable coil moves, the movable contact can be driven to move together to connect/disconnect the mechanical switch circuit. The switching manner simplifies linkage apparatuses and optimizes switching performance of the circuit breaker, and the switching time of the mechanical switch circuit can be reduced, thereby reducing the switching time of the circuit breaker.

With reference to the first aspect, in a possible implementation, the circuit breaker further includes a solid-state switch circuit. The solid-state switch circuit is connected in parallel to the mechanical switch circuit, when the circuit breaker is closed, the solid-state switch circuit is connected prior to the mechanical switch circuit, and when the circuit breaker is opened, the mechanical switch circuit is disconnected prior to the solid-state switch circuit.

The circuit breaker adopts a form in which the mechanical switch circuit and the solid-state switch circuit are connected in parallel, and an arc generated when contacts of the mechanical switch circuit are connected or disconnected can be avoided by using the solid-state switch circuit. This shortens arcing time, improves a switching speed of the circuit breaker, and prolongs a service life of the mechanical switch circuit.

With reference to the first aspect, in a possible implementation, the movable coil is configured to: when a current passing through the movable coil and the current passing through the stationary coil are in a same direction, move away from the stationary coil, and drive the movable contact to be disconnected from the stationary contact; and when the current passing through the movable coil and the current passing through the stationary coil are in same directions, approach the stationary coil, and drive the movable contact to be connected to the stationary contact.

With reference to the first aspect, in a possible implementation, the switch circuit includes a first switch S1 to a fourth switch S4. A first end of the drive module is connected to a first end of the first switch S1 and a first end of the second switch S2, a second end of the first switch S1 is connected to a first end of the stationary coil, a second end of the second switch S2 is connected to a second end of the stationary coil, a first end of the third switch S3 is connected to the first end of the stationary coil, a second end of the third switch S3 is connected to a first end of the movable coil, a first end of the fourth switch S4 is connected to the second end of the stationary coil, a second end of the fourth switch S4 is connected to the first end of the movable coil, and a second end of the movable coil is connected to a second end of the drive module.

The switches S1 to S4, the stationary coil, and the movable coil in the switch circuit form a drive circuit. The current direction of the stationary coil and the current direction of the movable coil can be the same or opposite by controlling on/off of the switches S1 to S4, thereby connecting/disconnecting of the mechanical switch circuit.

With reference to the first aspect, in a possible implementation, when the first switch S1 and the fourth switch S4 are turned on, and the second switch S2 and the third switch S3 are turned off, the current passing through the movable coil and the current passing through the stationary coil are in the same direction, and the movable coil and the stationary coil attract each other, to drive the movable contact to be connected to the stationary contact.

With reference to the first aspect, in a possible implementation, when the second switch S2 and the third switch S3 are turned on, and the first switch S1 and the fourth switch S4 are turned off, the current passing through the movable coil and the current passing through the stationary coil are in the same direction, and the movable coil and the stationary coil attract each other, to drive the movable contact to be disconnected from the stationary contact.

With reference to the first aspect, in a possible implementation, the drive module further includes an energy storage module, and the energy storage module is configured to supply a current to the drive module.

With reference to the first aspect, in a possible implementation, the energy storage unit includes a capacitor C1, a first end of the capacitor C1 is configured to be connected to the first end of the drive module, and a second end of the capacitor C1 is configured to be connected to the second end of the drive module.

With reference to the first aspect, in a possible implementation, the energy storage module further includes a diode D5, an anode of the diode D5 is connected to the second end of the capacitor C1, and a cathode of the diode D5 is connected to the first end of the capacitor C1.

Discharge efficiency of C1 can be improved by connecting the diode D5 in parallel at both ends of C1, thereby improving a switching speed of the mechanical switch circuit.

With reference to the first aspect, in a possible implementation, the movable coil and the stationary coil are connected in series with each other during operation.

According to a second aspect, a power supply system is provided, and the power supply system includes the circuit breaker according to any one of the first aspect or the possible implementations of the first aspect.

DETAILED DESCRIPTION OF THE EMBODIMENTS

The following describes the embodiments with reference to the accompanying drawings.

For ease of understanding, several terms are first described.

A circuit breaker may be used in a direct-current power supply system or an alternating-current power supply system. The circuit breaker refers to a switch apparatus that can connect, carry, and disconnect a current under a normal loop condition and can connect, carry, and disconnect a current under an abnormal loop condition within specified time. The circuit breaker has overload, short-circuit, and undervoltage protection functions, and can protect a line and a power supply.

A solid-state circuit breaker is also known as a solid-state switch circuit. The solid-state circuit breaker may refer to a circuit breaker that uses a transistor as a switch element, and the circuit breaker is controlled by using a contactless switch. The switch element may include power electronic devices, which are turned on/off to control conduction and disconnection of a current in a normal loop.

A mechanical circuit breaker is also known as a mechanical switch circuit and refers to a circuit breaker that uses a mechanical linkage apparatus to implement a conduction and disconnection function. The mechanical circuit breaker may include a contact system, an arc extinguishing system, an operating mechanism, a tripper, and the like.

A short-circuit breaking capacity refers to a maximum current value that a circuit breaker can break without being damaged.

An insulated gate bipolar transistor (IGBT) is a composite fully-controlled voltage driven power semiconductor device including a bipolar junction transistor (BJT) and a metal-oxide-semiconductor field-effect transistor (MOSFET) and has advantages of at least high input impedance of the MOSFET and a low conduction voltage drop of the BJT.

Figure 1:
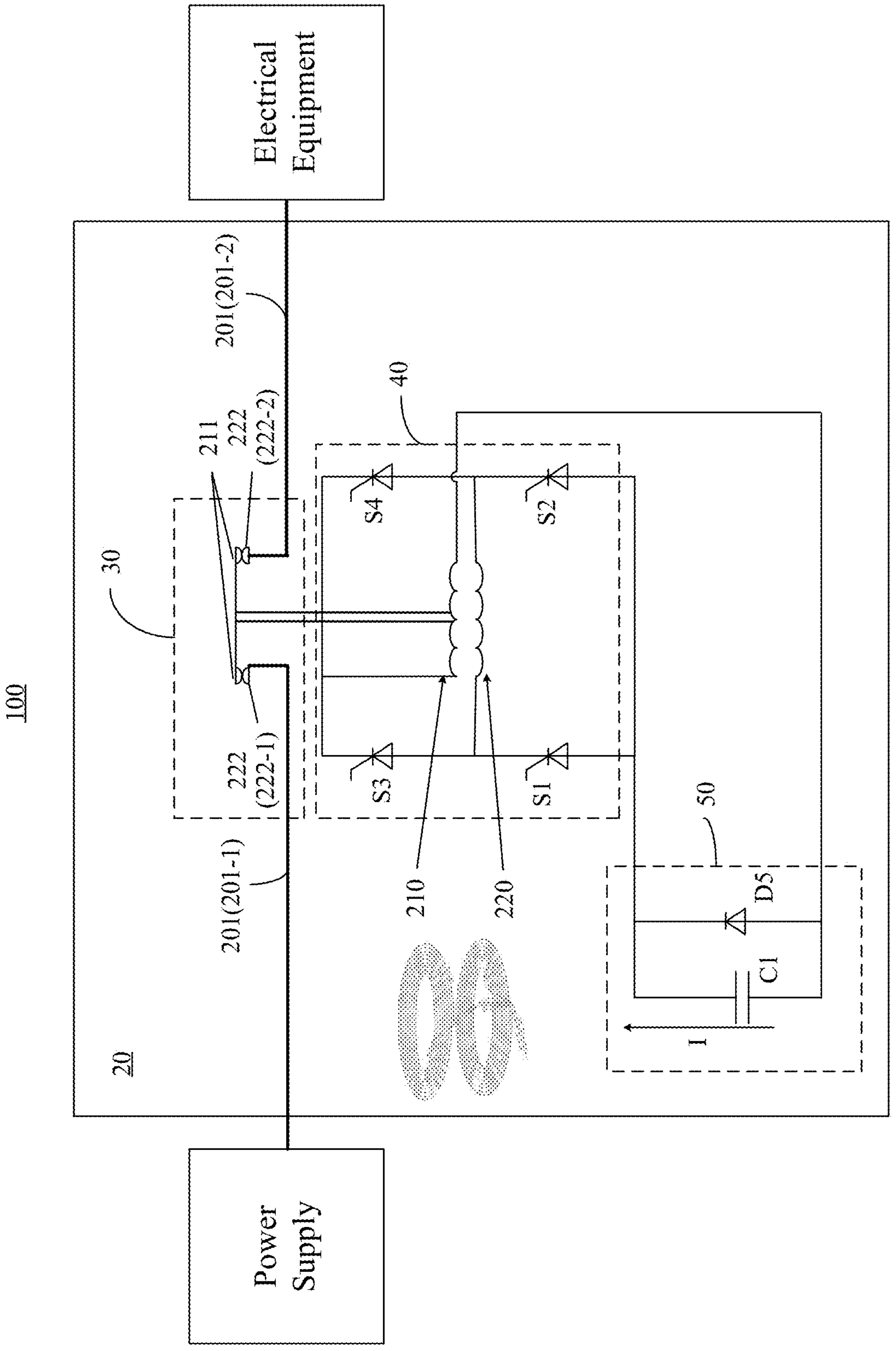
FIG. 1 is a schematic diagram of a circuit breaker 100 according to an embodiment.

FIG. 1 is a schematic diagram of a circuit breaker 100 according to an embodiment. As shown in FIG. 1, the circuit breaker 100 includes a mechanical switch circuit 20.

The mechanical switch circuit 20 includes a busbar 201, a power module 30, and a drive module 40. The busbar 201 is also referred to as a bus bank, refers to a main power supply line in a power device, has a large current flowing capability, and may include a copper bar or an aluminum bar.

The power module 30 includes a movable contact 211 and a stationary contact 222. The stationary contact 222 is electrically connected to the busbar 201, and the movable contact 211 is movable. When the movable contact 211 is connected to the stationary contact 222, the mechanical switch circuit 20 is connected, and when the movable contact 211 is disconnected from the stationary contact 222, the mechanical switch circuit 20 is disconnected. Optionally, the movable contact 211 and the stationary contact 222 may also be collectively referred to as a movable contact system.

Optionally, the busbar 201 may include a first busbar 201-1 and a second busbar 201-2, and the stationary contact 222 includes a first stationary contact 222-1 and a second stationary contact 222-2. The first stationary contact 222-1 is connected to the first busbar 201-1, and the second stationary contact 222-2 is connected to the second busbar 201-2. The first stationary contact 222-1 and the second stationary contact 222-2 are in an electrically disconnected state. Therefore, when the stationary contact 222 is disconnected from the movable contact 211, the first busbar 201-1 and the second busbar 201-2 are in the disconnected state, that is, the mechanical switch circuit 20 is in the disconnected state. When the stationary contact 222 is connected to the movable contact 211, the movable contact 211 is connected to the first stationary contact 222-1 and the second stationary contact 222-2 to provide a low resistance path between the first busbar 201-1 and the second busbar 201-2, so that the first busbar 201-1 is electrically connected to the second busbar 201-2, that is, the mechanical switch circuit 20 is in a connected state.

In some examples, the stationary contact 222 and the busbar 201 are of an integrated structure, or the stationary contact 222 is a part of the busbar 201.

The drive module 40 includes a switch circuit, a movable coil 210, and a stationary coil 220. The movable coil 210 and the stationary coil 220 are disposed adjacently, the switch circuit is configured to control a current direction of the movable coil 210 and a current direction of the stationary coil 220, and the movable coil 210 and the stationary coil 220 attract or repel each other based on whether the current directions are the same, to enable the movable coil 210 to drive the movable contact 211 to be connected to or disconnected from the stationary contact 222.

The movable coil 210 may drive the movable contact 211 to move. For example, the movable contact 211 and the movable coil 210 are of a fixed connection structure, or a linkage structure is disposed between the movable contact 211 and the movable coil 210.

A connection manner between the movable contact 211 and the movable coil 210 is not limited in this embodiment, provided that the movable coil 210 can drive the movable contact 211 to move when moving.

Optionally, the movable contact 211 and the movable coil 210 may be connected by using an insulating substance, in other words, the movable contact 211 and the movable coil 210 are electrically insulated. For example, the insulating substance may include an epoxy resin.

In other words, the switch circuit may control the current direction of the movable coil 210 and the current direction of the stationary coil 220 to be the same or opposite.

Optionally, a placement manner of the movable coil 210 and the stationary coil 220 is not limited in this embodiment, provided that a distance between the movable coil 210 and the stationary coil 220 can generate mutual repulsion or mutual attraction.

In some examples, the movable coil 210 and the stationary coil 220 are placed side by side. When a current passing through the movable coil 210 and the current passing through the stationary coil 220 are in a opposite direction, the movable coil 210 moves away from the stationary coil 220 and drives the movable contact 211 to be disconnected from the stationary contact 222. When the current passing through the movable coil 210 and the current passing through the stationary coil 220 are in same directions, the movable coil 210 approaches the stationary coil 220, and drives the movable contact 211 to be connected to the stationary contact 222.

It should be understood that when the current directions between the two coils are the same, directions of magnetic fields generated between the two coils are same. Therefore, the coils attract each other. When the current directions between the two coils are opposite, the directions of the magnetic fields generated between the two coils are the opposite. Therefore, the coils repel each other.

It may be understood that the switch circuit, the movable coil 210, and the stationary coil 220 form a drive system, and the movable coil 210, the movable contact 211, and the stationary contact 222 further form an armature system. An electromagnetic principle is used, so that the movable coil 210 drives the movable contact system to implement contact and disconnection and switching time of the mechanical switch circuit 20 can be reduced.

It should be understood that the switching time of the mechanical switch circuit 20 is related to the distance between the movable coil 210 and the stationary coil 220. For example, the mechanical switch circuit 20 is disconnected. A short distance between the movable coil 210 and the stationary coil 220 indicates that the movable contact 211 is fast disconnected from the stationary contact 222 and indicates short delay time between a start of the drive module 40 and the disconnection of the contacts. In this way, the switching time of the mechanical switch circuit 20 is short. The switching time of the mechanical switch circuit 20 can be modulated by adjusting the distance between the movable coil 210 and the stationary coil 220.

The mechanical switch circuit 20 uses the electromagnetic principle, so that the movable coil 210 drives the movable contact 211 to be connected to or disconnected from the stationary contact 222. The switching manner simplifies linkage apparatuses in a conventional mechanical switch circuit and optimizes switching performance of the mechanical switch circuit 20. For example, the switching time of the mechanical switch circuit 20 can be reduced, thereby reducing switching time of the circuit breaker 100.

As shown in FIG. 1, the switch circuit may include a plurality of switches (S1 to S4), and the direction of the current passing through the movable coil 210 and the direction of the current passing through the stationary coil 220 are controlled by controlling the plurality of switches to be turned on or off.

In some examples, the plurality of switches may be controllable switches. The controllable switch may include a fully-controlled switch or a semi-controlled switch. The fully-controlled switch, also referred to as a self-turn-off device, refers to a power electronic device that can be controlled to be turned on and off by using a control signal. Fully-controlled switches include, but are not limited to: a gate turn-off thyristor (GTO), a MOSFET, and an IGBT.

The semi-controlled switch refers to a power electronic device that can be controlled to be only turned on but cannot be controlled to be turned off by using a control signal. Semi-controlled switches include, but are not limited to, a thyristor.

For example, the switch circuit in FIG. 1 includes a first switch S1 to a fourth switch S4. A first end of the drive module 40 is connected to a first end of the first switch S1 and a first end of the second switch S2, a second end of the first switch S1 is connected to a first end of the stationary coil 220, a second end of the second switch S2 is connected to a second end of the stationary coil 220, a first end of the third switch S3 is connected to the first end of the stationary coil 220, a second end of the third switch S3 is connected to a first end of the movable coil 210, a first end of the fourth switch S4 is connected to the second end of the stationary coil 220, a second end of the fourth switch S4 is connected to the first end of the movable coil 210, and a second end of the movable coil 210 is connected to a second end of the drive module 40.

In FIG. 1, the movable coil 210 and the stationary coil 220 are connected in series with each other during operation and are placed side by side.

It should be understood that the switch circuit in FIG. 1 is merely an example, and the switch circuit may alternatively be implemented in another manner, provided that the switch circuit has a function of controlling the current direction of the movable coil 210 and the current direction of the stationary coil 220.

It should be understood that the circuit breaker 100 in FIG. 1 is merely used as an example. After proper deformation, the circuit breaker 100 may further include more or fewer functional modules and circuit components.

It should be understood that connection between two devices in this embodiment may mean a direct connection or may mean an indirect connection. In a case of the indirect connection, another unit, module, or device may be disposed between the two devices.

Figure 2:
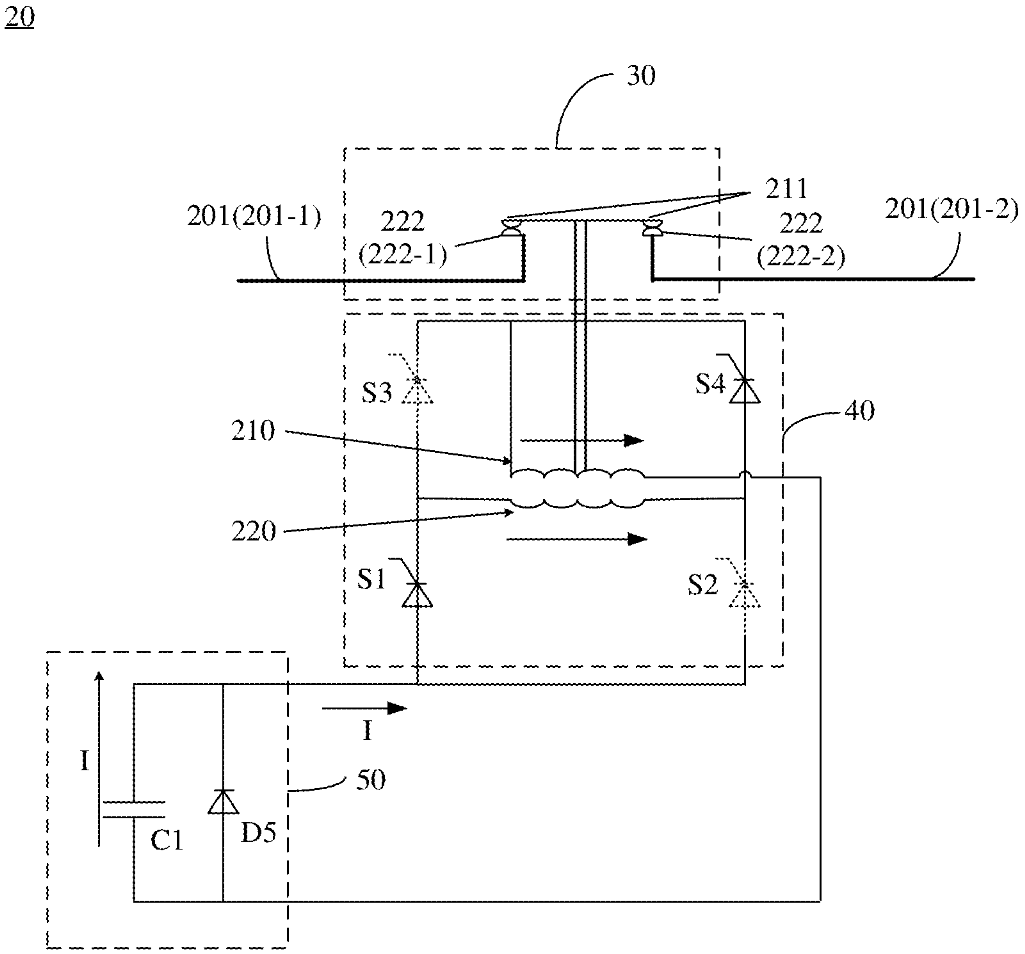
FIG. 2 is a schematic diagram of a working status of a mechanical switch circuit 200 according to an embodiment.

FIG. 2 is a schematic diagram of a working status of a mechanical switch circuit 200 according to an embodiment. In FIG. 2, the movable coil 210 and the stationary coil 220 attract each other. As shown in FIG. 2, when the mechanical switch circuit 20 needs to be connected, the first switch S1 and the fourth switch S4 may be controlled to be turned on, and the second switch S2 and the third switch S3 may be controlled to be turned off. A current sequentially passes through the first switch S1, the stationary coil 220, the fourth switch S4, and the movable coil 210. The current passing through the movable coil 210 and the current passing through the stationary coil 220 are in a same direction. Therefore, the movable coil 210 and the stationary coil 220 attract each other, and the movable coil 210 drives the movable contact to be connected to the stationary contact.

Figure 3:
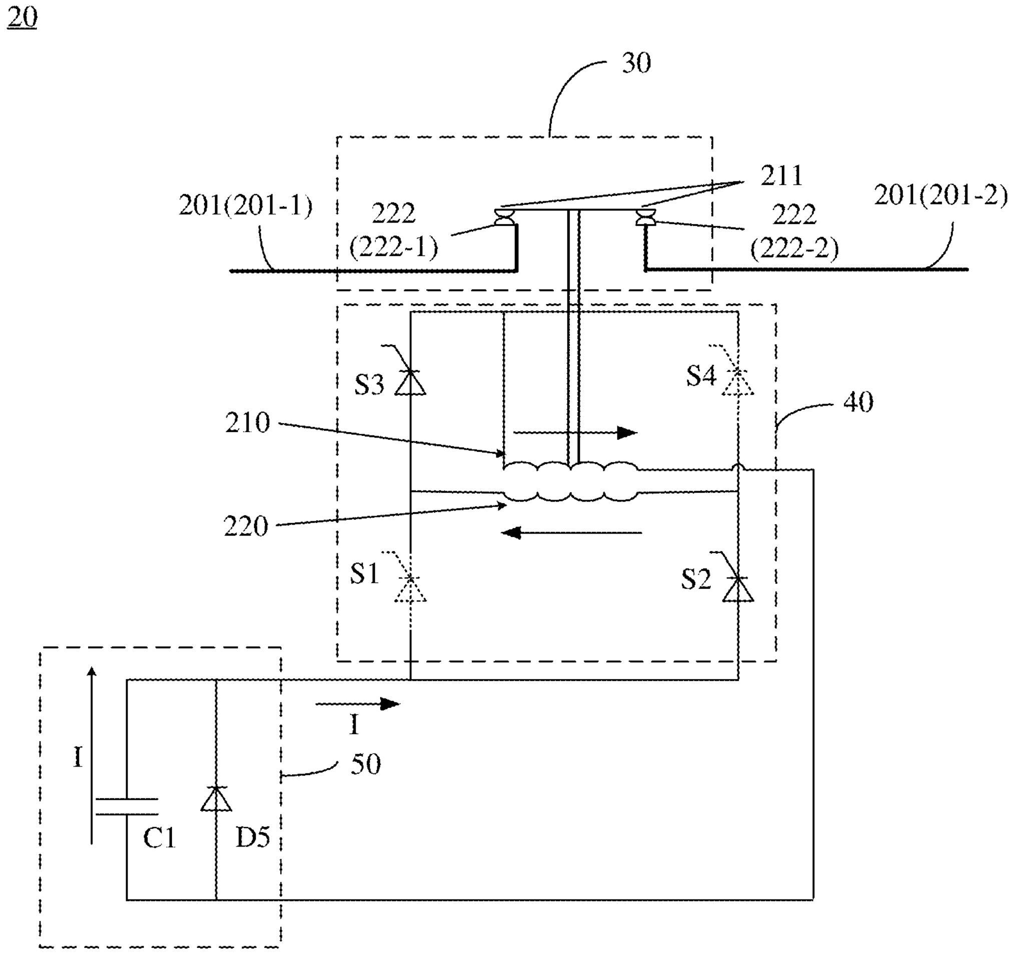
FIG. 3 is a schematic diagram of a working status of a mechanical switch circuit 200 according to an embodiment.

FIG. 3 is a schematic diagram of a working status of a mechanical switch circuit 200 according to an embodiment. In FIG. 3, the movable coil 210 and the stationary coil 220 repel each other. As shown in FIG. 3, when the mechanical switch circuit 20 needs to be disconnected, the second switch S2 and the third switch S3 may be controlled to be turned on, and the first switch S1 and the fourth switch S4 may be controlled to be turned off. A current sequentially passes through the second switch S2, the stationary coil 220, the third switch S3, and the movable coil 210. The current passing through the movable coil 210 and the current passing through the stationary coil 220 are in opposite directions. Therefore, the movable coil 210 and the stationary coil 220 repel each other, and the movable coil 210 drives the movable contact to be disconnected from the stationary contact.

Optionally, on/off of the switch in the switch circuit may be controlled by a control module. The control module may be disposed in the mechanical switch circuit 20 or may be independent of the mechanical switch circuit 20. This is not limited in this embodiment.

Optionally, as shown in FIG. 1, the mechanical switch circuit 20 further includes an energy storage module 50. The energy storage module 50 is configured to supply a current to the drive module 40, or supply, to the drive module 40, the current that passes through the movable coil 210 and the stationary coil 220.

In some examples, the energy storage module 50 may include a capacitor C1, and the capacitor C1 is configured to: store a charge and supply a current. For example, the capacitor C1 may obtain power from the busbar 201 and store the charge. Alternatively, the capacitor C1 may obtain power in another manner, for example, obtain the power from a battery. This is not limited. The capacitor C1 may supply a transient high current to fast connect/disconnect the mechanical switch circuit 20.

Optionally, a first end of the capacitor C1 is configured to be connected to the first end of the drive module 40, and a second end of the capacitor C1 is configured to be connected to the second end of the drive module 40.

Optionally, the capacitor C1 may be an electrolytic capacitor, a film capacitor, or may be a capacitor of another type.

Further, the energy storage module 50 further includes a diode D5, and the diode D5 and the capacitor C1 are connected in parallel. An anode of the diode D5 is connected to the second end of the capacitor C1, and a cathode of the diode D5 is connected to the first end of the capacitor C1. Discharge efficiency of C1 can be improved by connecting the diode D5 in parallel at both ends of C1, thereby improving a switching speed of the mechanical switch circuit 20.

Optionally, the energy storage module 50 may also use another implementation, provided that the energy storage module 50 can implement a function of supplying the current for the movable coil 210 and the stationary coil 220. For example, the energy storage module 50 may also include the battery, and the current is supplied by using the battery. Alternatively, the energy storage module 50 may further include a boost converter or a buck converter, to perform level conversion on a received voltage, and then output the current to the movable coil 210 and the stationary coil 220.

Figure 4:
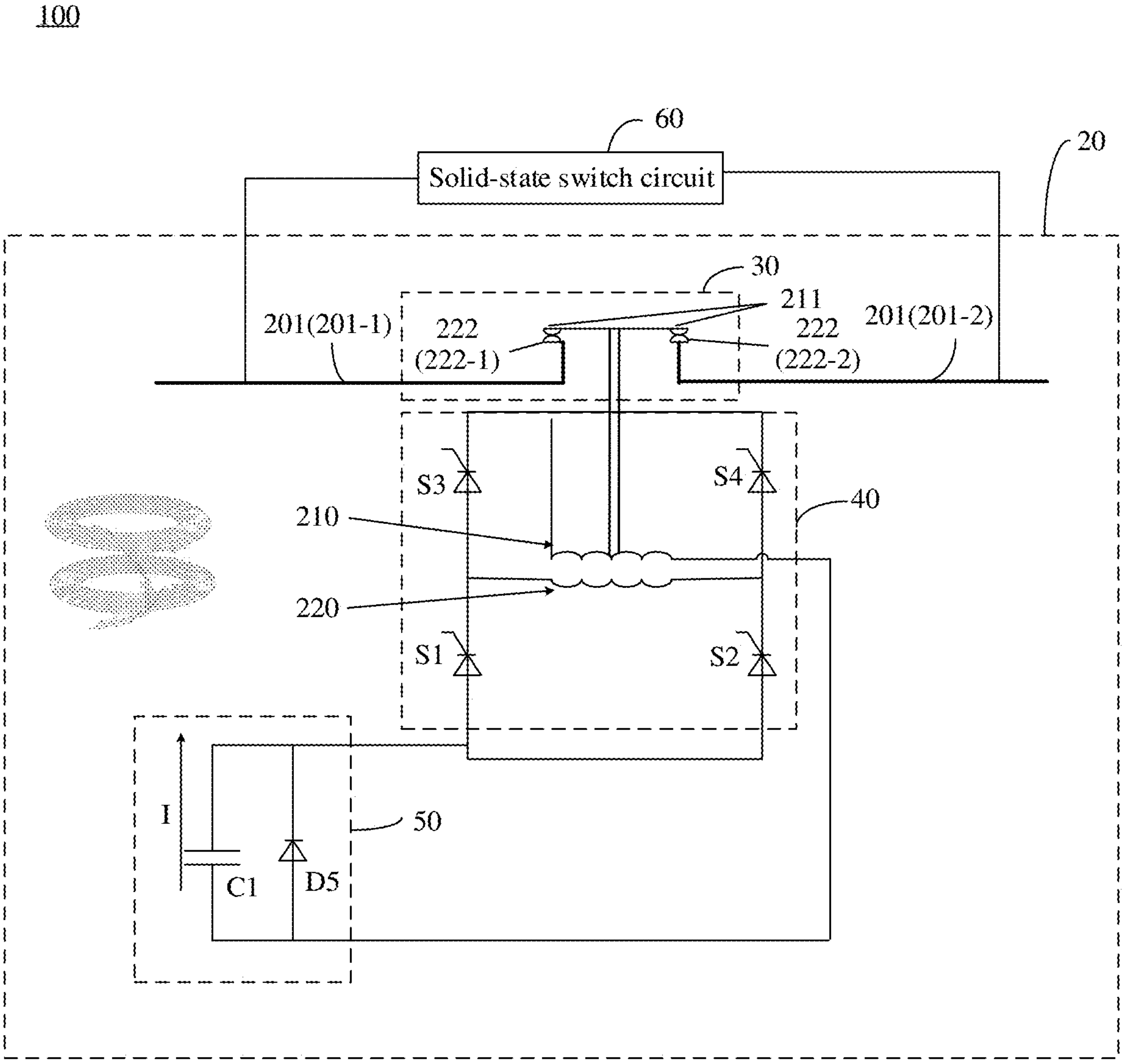
FIG. 4 is a schematic diagram of a circuit breaker 100 according to another embodiment.

FIG. 4 is a schematic diagram of a circuit breaker 100 according to another embodiment. Optionally, as shown in FIG. 4, the circuit breaker 100 may further include a solid-state switch circuit 60. The solid-state switch circuit 60 and the mechanical switch circuit 20 are connected in parallel. When the circuit breaker 100 is connected, the solid-state switch circuit 60 is connected prior to the mechanical switch circuit 20, and when the solid-state switch circuit 60 is disconnected, the mechanical switch circuit 20 is disconnected prior to the solid-state switch circuit 60.

In this embodiment, the circuit breaker 100 adopts a form in which the mechanical switch circuit 20 and the solid-state switch circuit 60 are connected in parallel, and an arc generated when contacts of the mechanical switch circuit 20 are connected or disconnected can be avoided by using the solid-state switch circuit 60. This shortens arcing time, improves a switching speed of the circuit breaker 100, and prolongs a service life of the mechanical switch circuit 20.

Optionally, a structure of the solid-state switch circuit 60 is not limited in this embodiment, provided that the solid-state switch circuit 60 can implement the foregoing function. For example, an example of the solid-state switch circuit 60 is described below with reference to FIG. 5 to FIG. 7.

Figure 5:
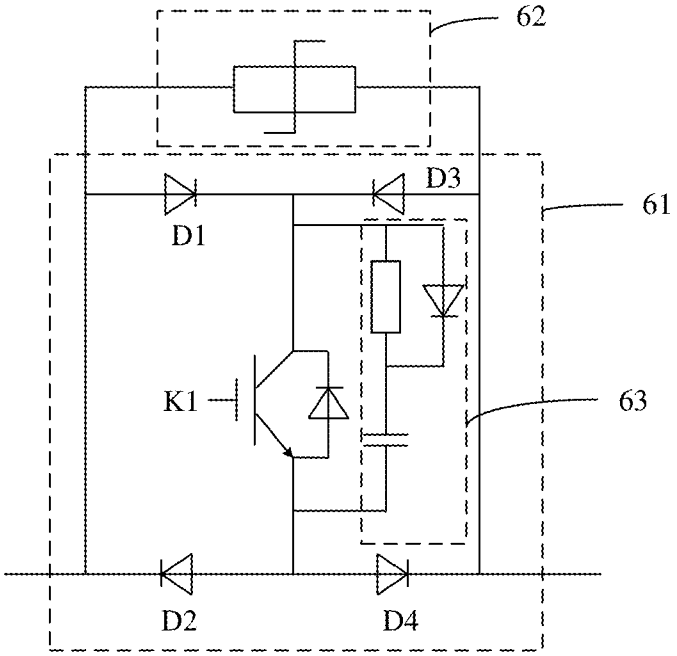
FIG. 5 is a schematic diagram of a structure of a solid-state switch circuit 60 according to an embodiment.

FIG. 5 is a schematic diagram of a structure of a solid-state switch circuit 60 according to an embodiment. As shown in FIG. 5, the solid-state switch circuit 60 includes a main switch circuit 61, a snubber circuit 62, and a buffer circuit 63.

The main switch circuit 61 includes diodes D1 to D4, and a switch transistor K1. The switch transistor K1 may be an IGBT, an integrated gate-commutated thyristor (IGCT), a MOS, or a BJT, or may be a switch device of another type.

As shown in FIG. 5, a first end of the solid-state switch circuit 60 is connected to an anode of the diode D1 and a cathode of the diode D2, and a second end of the solid-state switch circuit 60 is connected to an anode of the diode D3 and a cathode of the diode D4. A cathode of the diode D1 and a cathode of the diode D3 are connected to a first end of the switch transistor K1, and an anode of the diode D2 and an anode of the diode D4 are connected to a second end of the switch transistor K1.

If the switch transistor K1 is the IGBT, the first end of the switch transistor K1 is a collector electrode of the IGBT, and the second end of the switch transistor K1 is an emitter electrode of the IGBT.

The main switch circuit 61 is configured to control the solid-state switch circuit 60 by controlling conduction and disconnection of the switch transistor K1, and the main switch circuit 61 may implement a bidirectional control function.

Figure 6:
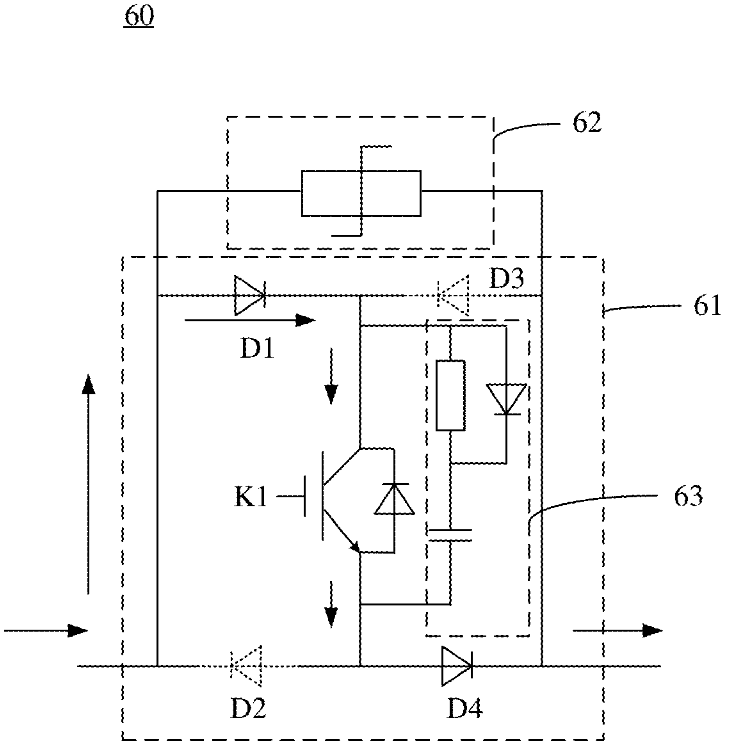
FIG. 6 and FIG. 7 separately show schematic diagrams of connection of a solid-state switch circuit 60 in different current directions.
Figure 7:
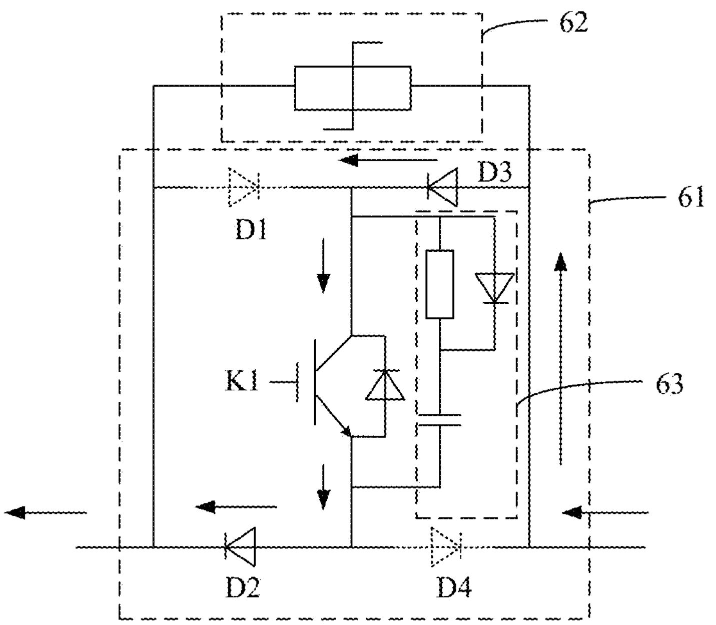

FIG. 6 and FIG. 7 separately show schematic diagrams of connection of a solid-state switch circuit 60 in different current directions. As shown in FIG. 6, the diode D1, the switch transistor K1, and the diode D4 may implement a current passage in one direction. As shown in FIG. 7, the diode D3, the switch transistor K1, and the diode D4 may implement a current passage in another direction.

The snubber circuit 62 may be configured to absorb energy when the switch transistor K1 is disconnected. The snubber circuit 62 may include a varistor. Varistors can be connected in parallel in the circuit. When the circuit is in normal use, impedance of the varistor is very high, and a leakage current is very small, which may be regarded as disconnected. Little impact is imposed on the circuit. However, when a very high sudden voltage arrives, resistance of the varistor drops instantly. This allows a large current to pass through the varistor, and an overvoltage is clamped to a value.

The buffer circuit 63 is configured to: when the switch transistor K1 is disconnected, protect the switch transistor K1 from being damaged due to the overvoltage, and reduce a disconnection loss of the switch transistor K1. A structure of the buffer circuit 63 is not limited, provided that the buffer circuit 63 can implement the foregoing function. Optionally, the solid-state switch circuit 60 may not include the buffer circuit 63.

Figure 8:
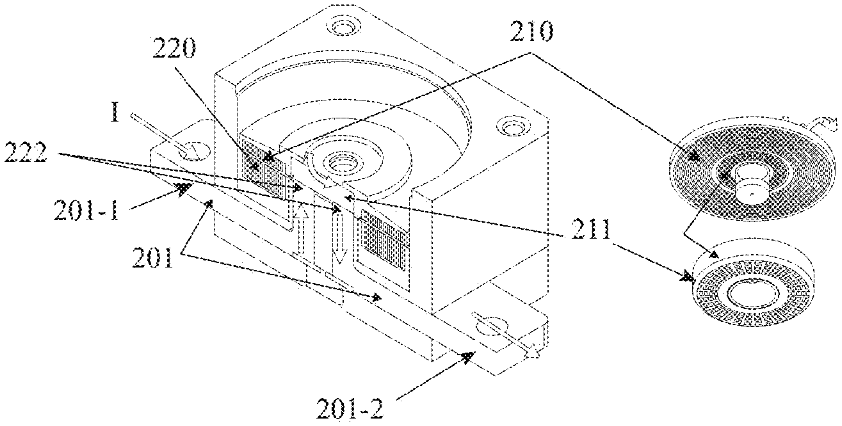
FIG. 8 is a schematic three-dimensional cross-sectional view of a mechanical switch circuit 20 according to an embodiment.

A structure of the mechanical switch circuit 20 in this embodiment is described with reference to the accompanying drawings. FIG. 8 is a schematic three-dimensional cross-sectional view of a mechanical switch circuit 20 according to an embodiment. As shown in FIG. 8, the mechanical switch circuit 20 includes the busbar 201, a power module (not marked in the figure), and a drive module (not marked in the figure).

The power module includes the movable contact 211 and the stationary contact 222. The stationary contact 222 is electrically connected to the busbar 201, and the movable contact 211 is movable. When the movable contact 211 is connected to the stationary contact 222, the mechanical switch circuit 20 is connected, and when the movable contact 211 is disconnected from the stationary contact 222, the mechanical switch circuit 20 is disconnected.

The drive module includes the movable coil 210 and the stationary coil 220. The movable coil 210 and the stationary coil 220 are disposed adjacently, so that the movable coil 210 and the stationary coil 220 attract or repel each other based on whether the current directions are the same. The movable coil 210 is configured to drive the movable contact 211 to be connected to or disconnected from the stationary contact 222.

The movable coil 210 may drive the movable contact 211 to move. For example, the movable contact 211 and the movable coil 210 are of the fixed connection structure, or the linkage structure is disposed between the movable contact 211 and the movable coil 210.

The connection manner between the movable contact 211 and the movable coil 210 is not limited in this embodiment, provided that the movable coil 210 can drive the movable contact 211 to move when moving.

Optionally, the movable contact 211 and the movable coil 210 may be connected by using the insulating substance, in other words, the movable contact 211 and the movable coil 210 are electrically insulated. For example, the insulating substance may include the epoxy resin.

Figure 12:
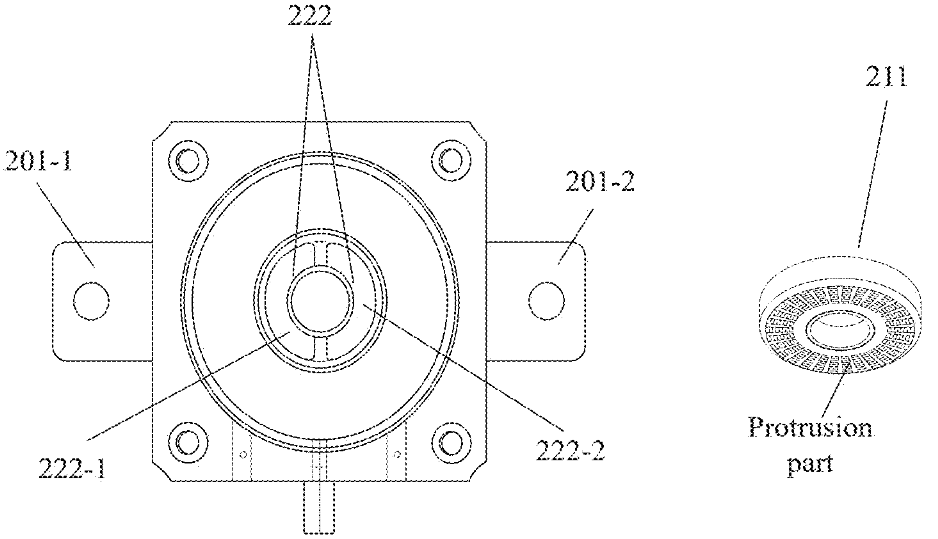
FIG. 12 is a schematic diagram of structures of a movable contact 211 and a stationary contact 222 according to an embodiment.

It can be seen from FIG. 8 that the busbar 201 includes two parts that are not connected to each other, which may be respectively referred to as the first busbar 201-1 and the second busbar 201-2, and the stationary contact 222 includes the first stationary contact 222-1 and the second stationary contact 222-2 (refer to FIG. 12). The first stationary contact 222-1 is connected to the first busbar 201-1, and the second stationary contact 222-2 is connected to the second busbar 201-2. The first stationary contact 222-1 and the second stationary contact 222-2 are in the electrically disconnected state. Therefore, when the stationary contact 222 is disconnected from the movable contact 211, the first busbar 201-1 and the second busbar 201-2 are in the electrically disconnected state, that is, the mechanical switch circuit 20 is in the disconnected state. When the stationary contact 222 is connected to the movable contact 211, the movable contact 211 is connected to the first stationary contact 222-1 and the second stationary contact 222-2 to provide the low resistance path between the first busbar 201-1 and the second busbar 201-2, so that the first busbar 201-1 is electrically connected to the second busbar 201-2, that is, the mechanical switch circuit 20 is in the connected state.

As shown in FIG. 8, in some examples, the movable coil 210 is coaxial with the movable contact 211, and the movable coil 210 may drive the movable contact 211 to move up and down in an axial direction. Further, the stationary coil 220 is coaxial with the movable coil 210.

Figure 9:
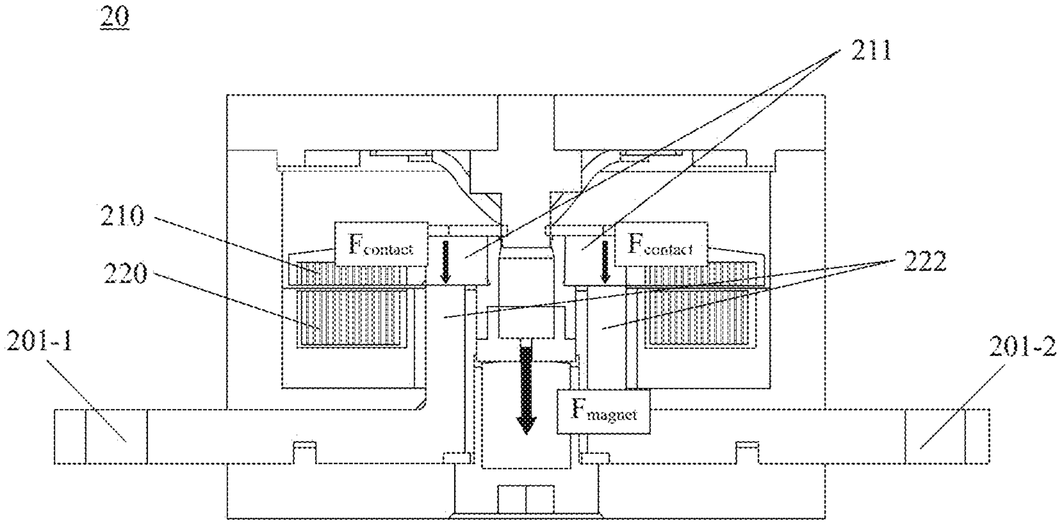
FIG. 9 is a schematic cross-sectional diagram of a mechanical switch circuit 20 in a connected state according to an embodiment.

FIG. 9 is a schematic cross-sectional diagram of a mechanical switch circuit 20 in a connected state according to an embodiment. In FIG. 9, the movable coil 210 and the stationary coil 220 move close to each other and are placed side by side. When the mechanical switch circuit 20 is in the connected state, the current passing through the movable coil 210 and the current passing through the stationary coil 220 are in the same directions. The movable coil 210 approaches the stationary coil 220 and drives the movable contact 211 to be connected to the stationary contact 222, so that the mechanical switch circuit 20 is connected. $F_{contact}$ in FIG. 9 represents a downward suction force applied to the movable coil 210 and the movable contact 211.

Optionally, a maintenance apparatus is further disposed in the mechanical switch circuit 20. The maintenance apparatus may be configured to: maintain the movable contact 211 and the stationary contact 222 in a contact state after the movable contact 211 is connected to the stationary contact 222 and maintain the movable contact 211 and the stationary contact 222 in a disconnected state after the movable contact 211 is disconnected from the stationary contact 222. For example, the maintenance apparatus in FIG. 9 is an electromagnet, and a suction force ($F_{magnet}$) generated by the electromagnet may maintain the movable contact 211 and the stationary contact 222 in the contact state. It should be understood that the foregoing maintenance apparatus is merely used as an example, and the maintenance apparatus may alternatively be implemented in another manner. In some examples, the maintenance apparatus may alternatively be implemented by using a mechanical structure such as a buckle. This is not limited in this embodiment.

Figure 10:
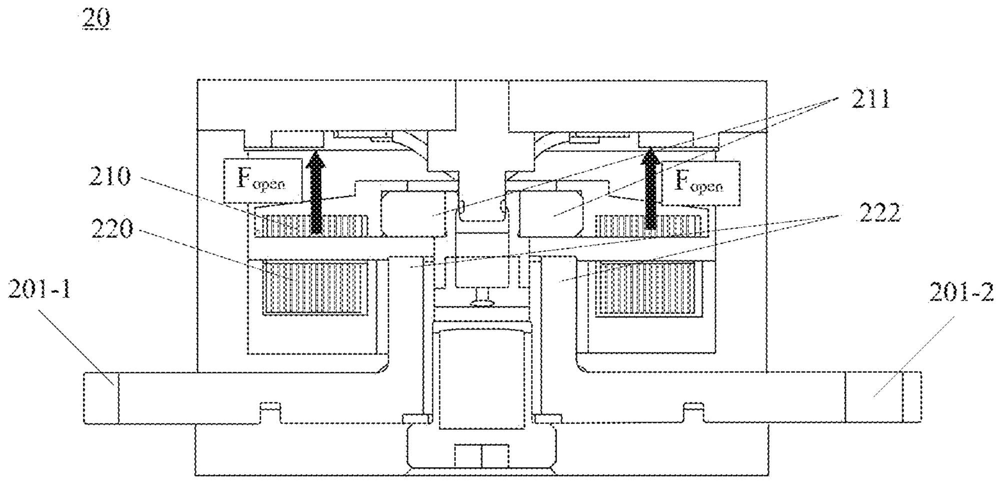
FIG. 10 is a schematic cross-sectional diagram of a mechanical switch circuit 20 in a connected state according to an embodiment.

FIG. 10 is a schematic cross-sectional diagram of a mechanical switch circuit 20 in a connected state according to an embodiment. As shown in FIG. 10, when the mechanical switch circuit 20 is in the connected state, the current passing through the movable coil 210 and the current passing through the stationary coil 220 are in the same direction. The movable coil 210 moves away from the stationary coil 220 and drives the movable contact 211 to be disconnected from the stationary contact 222, so that the mechanical switch circuit 20 is connected. $F_{open}$ in FIG. 10 represents an upward repulsion force applied to the movable coil 210 and the movable contact 211.

Optionally, a first conductive material is used for a wound coil of the movable coil 210, a second conductive material is used for a wound coil of the stationary coil 220, and a density of the first conductive material is less than a density of the second conductive material. For example, the conductive material of the movable coil 210 may be aluminum, and the conductive material of the stationary coil 220 may be copper.

In this embodiment, a low-density conductive material may be used for the wound coil of the movable coil 210, to reduce mass of the movable coil 210. This further reduces energy required when the movable coil 210 moves and saves power of the mechanical switch circuit 20.

For another example, a cross section of the movable coil 210 may be smaller than a cross section of the stationary coil 220, so that the mass of the movable coil 210 is smaller than mass of the stationary coil 220.

Figure 11:
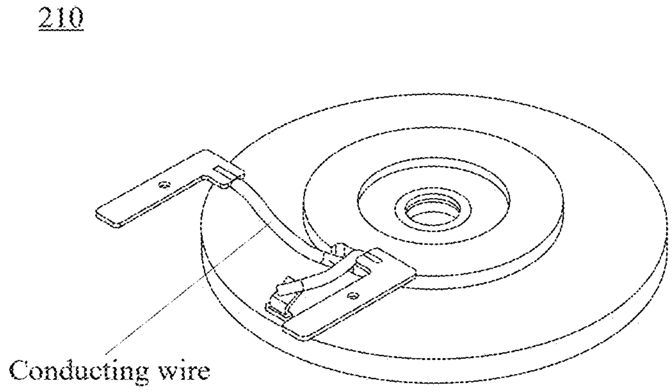
FIG. 11 is a top view of a movable coil 210 according to an embodiment.

FIG. 11 is a top view of a movable coil 210 according to an embodiment. As shown in FIG. 11, the wound coil of the movable coil 210 may be led out by a flexible conducting wire, so that the armature system can move automatically without being damaged.

FIG. 12 is a schematic diagram of structures of a movable contact 211 and a stationary contact 222 according to an embodiment. The stationary contact includes the first stationary contact 222-1 and the second stationary contact 222-2. As shown in FIG. 12, the movable contact 211 is used to ensure that when the movable contact system is disconnected, the stationary contacts 222 located on both sides are connected, to provide a low resistance path. When the armature system is activated, the movable coil 210 moves upward in its axial direction, and therefore, drives the movable contact 211 to move together. It should be noted that the switching speed of the mechanical switch circuit 20 is related to the distance between the movable coil 210 and the stationary coil 220. For example, the mechanical switch circuit 20 is disconnected. A long distance between the two coils indicates long delay time between the start of the mechanical switch circuit 20 and the disconnection of the contacts. Therefore, a fast disconnection speed of the movable contact 211 can be implemented by reducing the distance between the two coils, so that the switching speed of the mechanical switch circuit 20 can be improved, for example, a switching speed of several hundred μs (microseconds) can be implemented.

As shown in FIG. 12, in some examples, the movable contact 211 has a protrusion part along a first surface of the movable contact 211, to ensure reliable connection between the movable contact and the stationary contact, thereby improving switching sensitivity of the mechanical switch circuit 20. The first surface of the movable contact 211 is configured to be connected to the stationary contact 222.

Terms such as "component", "module", and "system" indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both of a computing device and an application that runs on the computing device may be components. One or more components may reside within a process and/or a thread of execution, and a component may be located on one computer and/or distributed between two or more computers. In addition, the components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and constraint conditions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the systems, apparatuses, and methods may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in the embodiments may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the embodiments may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes any medium, for example, a USB flash drive, a removable hard disk, a read-only memory (ROM), a random access memory (RAM), a magnetic disk, an optical disc, or the like that can store program code.

The foregoing description is merely an implementation, but is not intended to limit the scope of the embodiments. Any variation or replacement readily figured out by a person skilled in the art shall fall within the scope of the embodiments.

What is claimed is:

1. A circuit breaker, comprising a mechanical switch circuit, wherein the mechanical switch circuit comprises:

a busbar;

a power module, comprising a movable contact and a stationary contact that is electrically connected to the busbar, wherein, when the movable contact is connected to the stationary contact, the mechanical switch circuit is connected-, and when the movable contact is disconnected from the stationary contact, the mechanical switch circuit is disconnected; and a drive module, comprising a switch circuit, a movable coil, and a stationary coil, wherein the movable coil and the stationary coil are disposed adjacently to form a single coil pair, the switch circuit is configured to control a current direction of the movable coil and a current direction of the stationary coil, and the movable coil and the stationary coil attract each other when the current direction of the movable coil is aligned with the current direction of the stationary coil, and repel each other when the current direction of the movable coil is opposite to the current direction of the stationary coil, to enable the movable coil to drive the movable contact to be connected to or disconnected from the stationary contact.

2. The circuit breaker according to claim 1, wherein the movable coil and the movable contact are of a fixed connection structure, or a linkage structure is disposed between the movable coil and the movable contact.

3. The circuit breaker according to claim 2, wherein the movable contact and the movable coil are connected by using an insulating substance comprising epoxy resin.

4. The circuit breaker according to claim 3, wherein a first conductive material is used for a wound coil of the movable coil, a second conductive material is used for a wound coil of the stationary coil, and a density of the first conductive material is less than a density of the second conductive material.

5. The circuit breaker according to claim 1, further comprising:

a solid-state switch circuit, wherein the solid-state switch circuit is connected in parallel to the mechanical switch circuit, when the circuit breaker is closed, the solid-state switch circuit is connected prior to the mechanical switch circuit, and when the circuit breaker is opened, the mechanical switch circuit is disconnected prior to the solid-state switch circuit.

6. The circuit breaker according to claim 5, wherein a first end of the solid-state switch circuit is connected to an anode of a first diode and a cathode of a second diode, and a second end of the solid-state switch circuit is connected to an anode of a third diode and a cathode of a fourth diode, a cathode of the first diode and a cathode of the third diode are connected to a first end of the switch transistor, and an anode of the second diode and an anode of the fourth diode are connected to a second end of the switch transistor.

7. The circuit breaker according to claim 1, wherein the movable coil is configured to:

when a current passing through the movable coil and the current passing through the stationary coil are in a same direction, move away from the stationary coil, and drive the movable contact to be disconnected from the stationary contact; and when the current passing through the movable coil and the current passing through the stationary coil are in the same direction, approach the stationary coil, and drive the movable contact to be connected to the stationary contact.

8. The circuit breaker according to claim 1, wherein the switch circuit comprises a first switch to a fourth switch, wherein a first end of the drive module is connected to a first end of the first switch and a first end of the second switch, a second end of the first switch is connected to a first end of the stationary coil, a second end of the second switch is connected to a second end of the stationary coil, a first end of the third switch is connected to the first end of the stationary coil, a second end of the third switch is connected to a first end of the movable coil, a first end of the fourth switch is connected to the second end of the stationary coil, a second end of the fourth switch is connected to the first end of the movable coil, and a second end of the movable coil is connected to a second end of the drive module.

9. The circuit breaker according to claim 8, wherein, when the first switch and the fourth switch are turned on, and the second switch and the third switch are turned off, a direction of the current passing through the movable coil is aligned with a direction of the current passing through the stationary coil, and the movable coil and the stationary coil attract each other, to drive the movable contact to be connected to the stationary contact.

10. The circuit breaker according to claim 8, wherein, when the second switch and the third switch are turned on, and the first switch and the fourth switch are turned off, a direction of the current passing through the movable coil is opposite to a direction of the current passing through the stationary coil, and the movable coil and the stationary coil repel each other, to drive the movable contact to be disconnected from the stationary contact.

11. The circuit breaker according to claim 1, wherein the drive module further comprises:

an energy storage module configured to supply a current to the drive module.

12. The circuit breaker according to claim 11, wherein the energy storage module comprises:

a capacitor, a first end of the capacitor is configured to be connected to the first end of the drive module, and a second end of the capacitor is configured to be connected to the second end of the drive module.

13. The circuit breaker according to claim 12, wherein the energy storage module further comprises:

a diode, an anode of the diode is connected to the second end of the capacitor, and a cathode of the diode is connected to the first end of the capacitor.

14. The circuit breaker according to claim 1, wherein the movable coil and the stationary coil are connected in series with each other during operation.

15. A power supply system, comprising:

power supply, circuit breaker and electrical equipment, wherein the circuit breaker is connected between the power supply and the electrical equipment, and, the circuit breaker, comprising a mechanical switch circuit, wherein the mechanical switch circuit comprises:

a busbar;

a power module, comprising a movable contact and a stationary contact, wherein the stationary contact is electrically connected to the busbar, the movable contact is movable, when the movable contact is connected to the stationary contact, the mechanical switch circuit is connected, and when the movable contact is disconnected from the stationary contact, the mechanical switch circuit is disconnected; and a drive module, comprising a switch circuit, a movable coil, and a stationary coil, wherein the movable coil and the stationary coil are disposed adjacently to form a single coil pair, the switch circuit is configured to control a current direction of the movable coil and a current direction of the stationary coil, and the movable coil and the stationary coil attract each other when the current direction of the movable coil is aligned with the current direction of the stationary coil, and repel each other when the current direction of the movable coil is opposite to the current direction of the stationary coil, to enable the movable coil to drive the movable contact to be connected to or disconnected from the stationary contact.

16. The power supply system according to claim 15, wherein the movable coil and the movable contact are of a fixed connection structure, or a linkage structure is disposed between the movable coil and the movable contact.

17. The power supply system according to claim 15, further comprising:

a solid-state switch circuit, wherein the solid-state switch circuit is connected in parallel to the mechanical switch circuit, when the circuit breaker is closed, the solid-state switch circuit is connected prior to the mechanical switch circuit, and when the circuit breaker is opened, the mechanical switch circuit is disconnected prior to the solid-state switch circuit.

18. The power supply system according to claim 15, wherein the mechanical switch circuit comprises a first switch to a fourth switch, wherein a first end of the drive module is connected to a first end of the first switch and a first end of the second switch, a second end of the first switch is connected to a first end of the stationary coil, a second end of the second switch is connected to a second end of the stationary coil, a first end of the third switch is connected to the first end of the stationary coil, a second end of the third switch is connected to a first end of the movable coil, a first end of the fourth switch is connected to the second end of the stationary coil, a second end of the fourth switch is connected to the first end of the movable coil, and a second end of the movable coil is connected to a second end of the drive module.

19. The power supply system according to claim 18, wherein, when the first switch and the fourth switch are turned on, and the second switch and the third switch are turned off, a direction of the current passing through the movable coil is aligned with a direction of the current passing through the stationary coil, and the movable coil and the stationary coil attract each other, to drive the movable contact to be connected to the stationary contact.

20. The power supply system according to claim 18, wherein, when the second switch and the third switch are turned on, and the first switch and the fourth switch are turned off, a direction of the current passing through the movable coil is opposite to a direction of the current passing through the stationary coil, and the movable coil and the stationary coil repel each other, to drive the movable contact to be disconnected from the stationary contact.

* * * * *